United States Patent [19]

Flytzani-Stephanopoulos et al.

[11] Patent Number: 5,242,673
[45] Date of Patent: Sep. 7, 1993

[54] ELEMENTAL SULFUR RECOVERY PROCESS

[75] Inventors: Maria Flytzani-Stephanopoulos, Winchester; Zhicheng Hu, Somerville, both of Mass.

[73] Assignee: Massachusetts Institute of Technology, Cambridge, Mass.

[21] Appl. No.: 791,491

[22] Filed: Nov. 12, 1991

[51] Int. Cl.$^5$ .................... C01B 17/02; C01G 1/04
[52] U.S. Cl. ...................... 423/570; 423/244.19; 423/244.1; 423/416
[58] Field of Search ............... 423/570, 244 R, 569, 423/576, 244.09, 244.1, 244.02, 244.05, 416

[56] References Cited

U.S. PATENT DOCUMENTS

| | | | |
|---|---|---|---|
| 3,454,355 | 7/1969 | Ryason et al. | 23/2 |
| 3,653,833 | 4/1972 | Watson et al. | 23/226 |
| 3,755,551 | 8/1973 | Bridwell et al. | 423/570 |
| 3,864,459 | 2/1975 | Stiles | 423/570 |
| 3,978,200 | 8/1976 | Bajars | 423/570 |
| 4,001,375 | 1/1977 | Longo | 423/563 |
| 4,081,519 | 3/1978 | Whelan | 423/570 |
| 4,251,496 | 2/1981 | Longo et al. | 423/244 R |
| 4,346,063 | 8/1982 | Cahn et al. | 423/244 R |
| 4,826,664 | 5/1989 | Kay et al. | 423/573.1 |
| 4,857,296 | 8/1989 | Brunelle et al. | 423/576 |

OTHER PUBLICATIONS

Hunter, Jr. et al., "The Allied Chemical Sulfur Dioxide Reduction Process For Metallurical Emissions," Advances in Chemistry Series, No. 139, p. 48 American Chemical Society, 1975.

Kwong et al., "The Parsons FGC Process Simultaneous Removal of SO$_X$ and NO$_X$" Presented at the 1990 Annual Meeting of AICHE, Chicago, Ill. Nov. 11-16, 1990.

Querido and Short, "Removal of Sulfur Dioxide from Stack Gases by Catalytic Reduction to Elemental Sulfur with Carbon Monoxide," Ind. Eng. Chem. Process Des. Develop., vol. 12, No. 1, p. 10, 1973.

Khalafalla et al., "Catalytic Reduction of Sulfur Dioxide on Iron-Alumina Bifunctional Catalysts,"0 Ind. Eng. Chem. Prod. Res. Develop., vol. 10, No. 2, p. 133, 1971.

Bazes et al., "Catalytic Reduction of Sulfur Dioxide with Carbon Monoxide on Cobalt Oxides," Ind. Eng. Chem., Prod. Res. Develop., vol. 14, No. 4 p. 264, 1975.

Hibbert and Campbell, "Flue Gas Desulfurization: Catalytic Removal of Sulfur Dioxide by Carbon Monoxide on Sulfided La$_{1-x}$Sr$_x$CoO$_3$", Applied Catalysis, vol. 41, p. 289, 1988.

Hass et al., "Packaged Selectox UNITS—A New Approach to Sulfur Recovery," presented at 60th Annual GPA Convention, Mar. 23-25, 1991 San Antonio, Tex.

Powell et al., "Preparation of Cerium Dioxide Powders for Catalyst Supports," J. Am. Ceram. Soc., vol. 71, C-104-C-106, 1988.

Courty et al., "The Preparation of Highly Dispersed Mixed Oxides and Oxide Solid Solutions by the Pyrolysis of Amorphous Precursors," (in French), Powder Technol., vol. 7, p. 21, 1973.

Dorchak and Gangwal, "Direct Sulfur Recovery Process for Elemental Sulfur Recovery From Gas," ACS Div. Fuel Chemistry, vol. 35, No. 1, p. 207, 1990.

United States Department of Energy, Morgantown Energy Research Center, "Chemistry of Hot Gas Cleanup in Coal Gasification and Combustion," Feb. 1978.

Gilbert, "The NOXSO POC Pilot Plant Advanced Flue Gas Clean-Up Technology," 6th Annual Coal Prep'n., and Environ. Control Contractor Conference Proceedings, Aug. 1990, Pittsburgh.

Primary Examiner—Gary P. Straub
Attorney, Agent, or Firm—Wolf, Greenfield & Sacks

[57] ABSTRACT

An improved catalytic reduction process for the direct recovery of elemental sulfur from various SO$_2$-containing industrial gas streams. The catalytic process provides combined high activity and selectivity for the reduction of SO$_2$ to elemental sulfur product with carbon monoxide or other reducing gases. The reaction of sulfur dioxide and reducing gas takes place over certain catalyst formulations based on cerium oxide. The process is a single-stage, catalytic sulfur recovery process in conjunction with regenerators, such as those used in dry, regenerative flue gas desulfurization or other processes, involving direct reduction of the SO$_2$ in the regenerator off gas stream to elemental sulfur in the presence of a catalyst.

5 Claims, 2 Drawing Sheets

ELEMENTAL SULFUR RECOVERY PROCESS

This invention was made with government support under Contract Number DE-AC22-89PC89805 awarded by the Department of Energy. The government has certain rights in the invention.

BACKGROUND OF THE INVENTION

1. Field of the Invention

The present invention relates to recovery of elemental sulfur from gas streams containing sulfur dioxide.

2. Description of the Prior Art

Flue gases emitted from burning sulfur containing fossil fuels are the most common dilute sulfur dioxide ($SO_2$) containing industrial gases. The majority of commercial scale flue gas desulfurization (FGD) plants in use today for combustion gas purification are based on wet scrubbing processes. Many of them are of the "throwaway" type, fixing the sulfur in a solid waste product, which requires disposal. These FGD systems do not recover elemental sulfur. However, several other wet and dry FGD processes are of the regenerative type combining sulfur dioxide removal with active medium regeneration and concomitant sulfur recovery.

Many sulfur recovery methods have been proposed. Often the type and location of the primary operation (sulfur source) dictate the choice of the sulfur recovery method. For example, sulfur recovery from metallurgical operations (smelters, sulfide ore roasters) is typically in the form of sulfuric acid. On the other hand, petroleum refineries emit $H_2S$-rich gas streams which are processed in multi stage Claus plants to recover elemental sulfur.

Recovery of sulfur values in elemental sulfur form is more desirable than sulfuric acid or liquid $SO_2$, as local market conditions are typically more restrictive for the latter. (See, for example, J. B. Rinckhoff, in J. B. Pfeiffer, (ed.), "Sulfur Removal and Recovery from Industrial Processes," Advances in Chemistry Series, No. 139, p. 48, American Chemical Society, 1975). For $SO_2$-containing industrial gases, this means reducing the $SO_2$ with a gaseous reducing agent, such as carbon monoxide, hydrogen, synthesis gas ($H_2+CO$), or natural gas, or with a carbonaceous solid (such as activated charcoal, coke, anthracite coal). The Allied Chemical sulfur dioxide reduction technology employs a catalyst over which $SO_2$ reduction by natural gas ($CH_4$) takes place, producing a mixture of $H_2S$, elemental sulfur and (unconverted) $SO_2$. After condensation of sulfur, further sulfur recovery is accomplished in two-stage Claus plants. This process requires relatively concentrated $SO_2(>4.0\%)$ gases and downstream Claus plants to complete sulfur recovery. (See, for example, W. D. Hunter, Jr., "Reducing $SO_2$ in Stack Gas to Elemental Sulfur," Power 117 (9), 63, 1973); U.S. Pat. Nos. 3,653,833 (April, 1972), and 3,755,551 (August, 1973)). The RESOX process, developed by the Foster Wheeler Energy Corporation, described in "The FW-BF $SO_2$ Removal System," (Sulfur, No. 119, 24–26 and 45, July-Auqust 1975), partially reduces the $SO_2$-rich streams ($>10.0\%$ $SO_2$) to elemental sulfur and organosulfur compounds by reaction with coke at 850°–900° C. (See also, R. E. Rush, and R. A. Edwards, "Operating Experience with Three 20 MW Prototype Flue Gas Desulfurization Processes at Gulf Power Company's Scholtz Electric Generating Station," presented at EPA Flue Gas Desulfurization Symposium, Hollywood, Fla., Nov. 8–11, 1977).

Direct flue gas reduction by synthesis gas over an undisclosed catalyst is proposed by K. V. Kwong et al. in "The Parsons FGC Process Simultaneous Removal of $SO_x$ and $NO_x$," (presented at the 1990 Annual Meeting of AIChE, Chicago, Ill., Nov. 11–16, 1990) to simultaneously reduce the oxygen, $SO_x$ and $NO_x$ in the flue gas. The $H_2S$ produced is selectively recovered by solvents, concentrated and taken to multi-stage Claus plants for elemental sulfur recovery. This process does not achieve a single-step $SO_2$ reduction to sulfur. Similarly, earlier proposed schemes of flue gas reduction could not achieve both high $SO_2$ conversion as well as high selectivity to elemental sulfur in a single-stage catalytic reactor.

The catalytic removal of sulfur dioxide by carbon monoxide involves a main reaction producing elemental sulfur:

$$SO_2 + 2 CO = \frac{1}{x} S_x + 2 CO_2 \qquad (1)$$

where x varies between 2 and 8, as well as a competing side reaction producing carbonyl sulfide:

$$CO + S = COS \qquad (2)$$

At about the stoichiometric ratio of $CO/SO_2$ reaction (1) is favored, while excess CO increases production of COS.

R. P. Ryason et al. (Air Pollut. Contr. Ass. 17, 796, 1967), and U.S. Pat. No. 3,454,355 (July, 1969) reported on the use of single-bed catalysts (Cu, Pd, Ag, Co or Ni supported on alumina) to produce sulfur from dry sulfur dioxide gases. R. Querido and W. L. Short, and V. C. Okay and W. L. Short (Ind. Eng. Chem. Prod. Res. Develop. 12, 10 and 291, 1973) demonstrated the feasibility of reducing sulfur dioxide by carbon monoxide on a Cu-alumina catalyst at concentrations and temperatures typical of power plant stack gases; however, the catalyst activity was severely poisoned by water vapor. To address similar problems on iron-alumina catalysts, Khalafalla et al. (Ind. Eng. Chem. Prod. Res. Develop. 10(2), 133, 1971 (also in "Sulfur Removal and Recovery from Industrial Processes" supra, at 60) proposed using dual catalyst beds, the second bed serving as a Claus reactor which produces elemental sulfur by reacting a portion of the $SO_2$-feed stream with by-product $H_2S$ released from the first catalyst bed.

Cobalt oxides have been examined by J. G. I. Bazes, L.S. Caretto and K. Nobe as catalysts for the reduction of sulfur dioxide with carbon monoxide (Ind. Eng. Chem. Prod. Res. Develop., 14(4), 264, 1975). The primary focus of that paper was to study the $SO_2$ conversion over various cobalt oxide catalysts ($LaCo_3$, $CeO_2$—$Co_3O_4$, $CuCo_2O_4$) selectively to carbonyl sulfide (COS) rather than elemental sulfur. At temperatures between 287° and 381° C. and $CO/SO_2$ ratios between 3.64 and 5.68, the highest sulfur dioxide conversion disclosed in this article was 94% with selectivity to COS of 48%. More recently, D. B. Hibbert and R. H. Campbell in "Flue Gas Desulfurization: Catalytic Removal of Sulfur Dioxide by Carbon Monoxide on Sulfided $La_{1-x}Sr_xCoO_3$" (Applied Catalysis 41, 289, 1988), disclosed strontium doped lanthanum cobalt oxides to reduce sulfur dioxide with carbon monoxide. Even at near stoichiometric ratios of $CO/SO_2$ however, the formation of COS continues to be a factor, limiting the elemental sulfur recovery.

In addition to power plant-$SO_2$ emissions, dilute sulfur dioxide-containing gas streams are produced in waste incinerators, industrial furnaces, and by process equipment used in petroleum refineries and sulfuric acid plants, and spent sorbent or catalyst regenerator equipment. Sulfur recovery involves several steps, such as partial reduction of $SO_2$ to $H_2S$, followed by Claus processing. No single-stage process presently exists to directly reduce the varying $SO_2$-effluent gases to elemental sulfur over a catalyst and which displays both high activity and high selectivity.

Cerium oxide formulations are known in the art as good absorbents of sulfur oxides (removal of $So_2$ from oxygen-containing flue gases via conversion to solid sulfates that can be regenerated back to the oxide form is disclosed by J. M. Longo in "Process for Desulfurization of Flue Gas", U.S. Pat. No. 4,001,375 (1977)). Also, R. P. Cahn and J. M. Longo, "Desulfurization of Hot Gas with Cerium Oxide", U.S. Pat. No. 4,346,063 (1982) showed that cerium oxide catalyzes the oxidation of $H_2S$ to $SO_2$, which can then be removed by reacting with $CeO_2$ (to form a sulfate). Therefore, $CeO_2$ may be used for Claus plant tail gas treatment by adding oxygen in the gas. J. P. Brunelle et al., in "CeO Catalytic Desulfurization of Industrial Gases," U.S. Pat. No. 4,857,296 (August, 1989), disclose $CeO_2$ as a good catalyst for the Claus reaction, $2H_2S + SO_2 = 3S + 2H_2O$, and for the hydrolysis of organosulfur compounds (COS and $CS_2$) displaying an especially high activity for the latter.

The prior art however does not teach or suggest the use of cerium oxide formulations as catalysts for the direct elemental sulfur recovery from $SO_2$-containing industrial gas streams by reacting these gas streams with carbon monoxide or other reducing gases.

SUMMARY OF THE INVENTION

Accordingly, the present invention provides a process for reducing $SO_2$ with carbon monoxide or other reducing gas over a catalyst which displays combined high activity and selectivity for $SO_2$ reduction to elemental sulfur product.

In one embodiment of the invention, the catalytic sulfur recovery occurs in a single stage involving direct reduction of the $SO_2$ in an off-gas stream to elemental sulfur. The process involves feeding a gas stream containing $SO_2$ into a reactor, introducing a sufficient amount of a reducing gas stream into the reactor, and reacting the $SO_2$ and reducing gas in the presence of a cerium oxide containing catalyst.

In another embodiment of the invention the catalytic sulfur recovery involves feeding a combustion exhaust gas stream containing $SO_2$ into a reactor, removing the $SO_2$ present by absorption on a metal oxide absorbent, regenerating the metal oxide absorbent, introducing the regeneration off-gas stream containing $SO_2$ into a catalytic sulfur recovery reactor, introducing a sufficient amount of a reducing gas stream into the reactor, and reacting the $SO_2$ and reducing gas in the presence of a catalyst selectively to elemental sulfur.

Other objects and features of the present invention will become apparent from the following detailed description when taken in connection with the accompanying drawings which disclose multiple embodiments of the invention. It is to be understood that the drawings are designed for the purpose of illustration only and are not intended as a definition of the limits of the invention.

BRIEF DESCRIPTION OF THE DRAWINGS

The foregoing and other objects and advantages of the invention will be appreciated more fully from the following drawings in which.

DETAILED DESCRIPTION OF THE INVENTION

The present invention involves the removal of $SO_2$ from industrial gas streams by catalytic reduction of the $SO_2$ to elemental sulfur.

Figure 1:
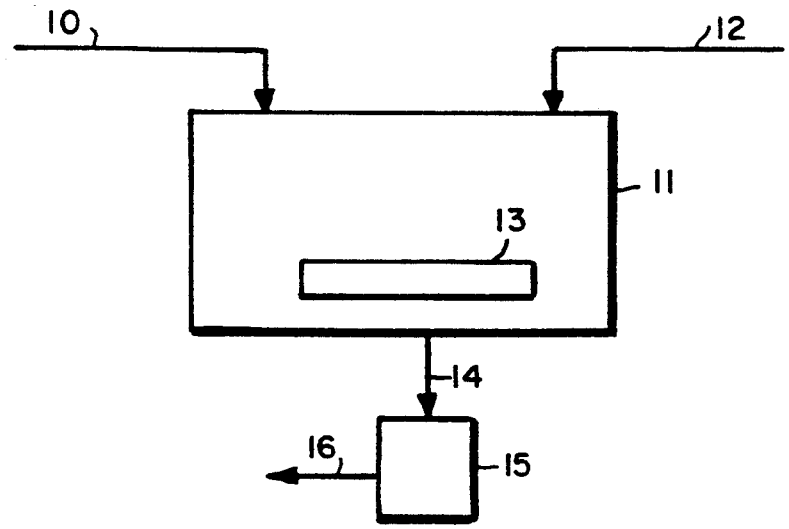
FIG. 1 is a schematic representation of a sulfur recovery process according to the present invention.

Referring to FIG. 1, the process of the present invention includes feeding a gas stream 10 containing sulfur dioxide into a reactor 11, introducing a reducing gas stream 12 into the reactor 11, and reacting the sulfur dioxide of gas stream 10 with the reducing gas 12 in the presence of a cerium oxide catalyst 13. The gas stream 10 preferably includes a combustion off-gas, regeneration effluent gas, or industrial process gas. As a result, the gas stream may or may not have oxygen present. Any stream containing sulfur dioxide can be treated by the catalytic reduction process of the present invention. Typically, the amount of sulfur dioxide present in the gas stream 10 will range in concentration between 0.1% to about 10.0%. Other components of the gas stream 10 may include, for example, nitrogen, carbon dioxide, oxygen, and steam. Typically, the gas stream 10 containing sulfur dioxide will enter reactor 11 at a space velocity (VVH) between about 500 to about 20,000 $h^{-1}$.

The reducing gas stream 12 introduced into the reactor 11 may be any reducing gas such as carbon monoxide, hydrogen, natural gas, synthesis gas, and mixtures thereof. Preferably, a carbon monoxide reductant is used, reducing sulfur dioxide according to reaction (1) above. The amount of the reducing gas stream 12 introduced into the reactor 11 preferably is such that at least 90% conversion of the sulfur dioxide is achieved. Preferably, the ratio of reducing gas to sulfur dioxide will be greater than or equal to 1.90 because at such ratios, selectivity toward elemental sulfur of at least 95%, and at least 90% conversion will be achieved. As the ratio of reducing gas is increased, however, the selectivity of the conversion increases toward carbonyl sulfide at the expense of elemental sulfur production. As a result, the especially preferred range for the ratio of reducing gas to sulfur dioxide is therefore between about 1.90 to about 2.20. As noted, control of the reducing gas concentration to the stoichiometric value will result in high conversion of the sulfur dioxide selectively to elemental sulfur. The $CO/SO_2$ ratio may be higher if the gas stream 10 has other components which react with the reducing gas stream 12, such as oxygen, and/or nitrogen oxides.

The catalyst 13 is a solid material comprised of cerium oxide. The catalyst may or may not contain additive oxide catalysts or dispersants such as rare earth oxides, aluminum oxide, titanium oxide, zirconium oxide, provided either as supports or bulk dispersants of cerium oxide. Also, the catalyst may comprise at least one oxide from the oxides of copper, iron or other Group VIII metals, or other transition metal oxides. The important and characterizing feature of the catalyst of the present invention is that it contains cerium oxide. As indicated above, both bulk cerium oxide as well as supported cerium oxide are active for the reduction of $SO_2$. If supported, the catalyst 13 preferably is in the range of 0.5 to 50% by weight, and has a surface area in the range of 20–500 $m^2/g$. If unsupported, the catalyst 13 preferably has a surface area of 5–70 $m^2/g$.

Various known synthesis routes may be used to prepare cerium oxide in bulk, admixed or supported form. Thermal decomposition in air of salts of cerium such as the acetates, oxalates, nitrates, sulfates, or carbonates may be chosen for ceric oxide preparation as is well known to those of skill in the art. Also ceric oxide and mixed oxides of cerium with any of the oxides indicated above may be prepared according to the amorphous citrate technique, as described by P. Courty, H. Ajot, C. Marcilly and B. Delmon, in "The Preparation of Highly Dispersed Mixed Oxides and Oxide Solid Solutions by the Pyrolysis of Amorphous Precursors", (Powder Technology 7, 21–38, 1973). Also, compare B. R. Powell, R. L. Bloink, and C. C. Eickel, "Preparation of Cerium Dioxide Powders for Catalyst Supports," (J. Am. Ceram. Soc., 71(2), C-104-C-106, 1988), which studies a spray-drying variation of the amorphous citrate technique to produce bulk $CeO_2$ structure characterized by high surface area and thermal stability. Physical forms of the cerium oxide containing catalysts may include granules, extrusions or pellets. Various other active phase-on-support configurations such as honeycomb monoliths may also be used as would be apparent to those of skill in the art.

The process of the present invention is typically carried out at temperatures of between about 300° C. to about 700° C. Preferably, the reaction of the present invention occurs at temperatures of between about 350° C. to about 650° C. The most preferable reaction temperature is between about 400° C. to about 550° C. The preferred reaction pressure is atmospheric although other pressures may be utilized.

Once the sulfur dioxide has been converted to elemental sulfur, the sulfur product contained in exit gas stream 14 may be recovered in a sulfur trap 15 by employing known techniques such as condensation. After sulfur recovery, the treated gas stream 16 is released.

Figure 2:
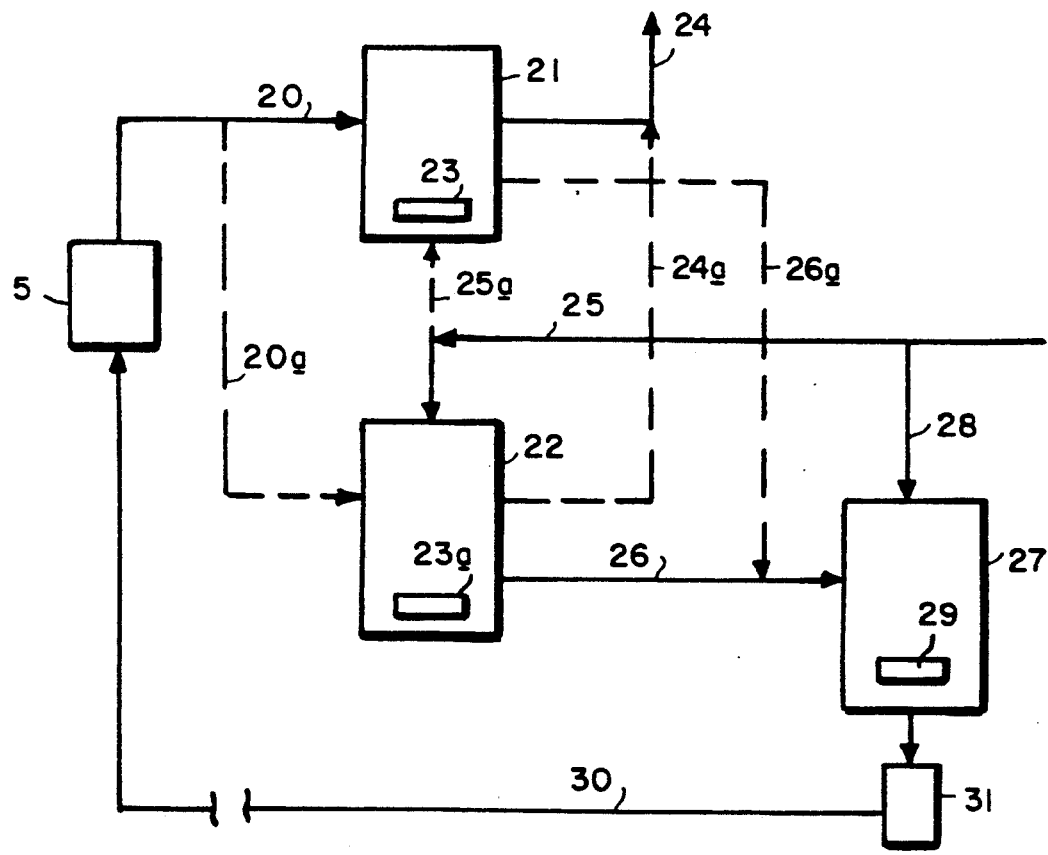
FIG. 2 is a schematic representation of a sulfur recovery process according to the present invention.

The regenerative $SO_2$ removal process in combination with a sulfur recovery process illustrated in FIG. 2 includes the steps of feeding a combustion exhaust gas stream 20 containing sulfur dioxide into a first reactor 21 (or 22) and removing the sulfur dioxide present in the combustion exhaust gas stream 20 by absorption on a metal oxide sorbent 23 forming a solid sulfate. After absorption in the first reactor 21 (or 22), the treated gas stream 24 is released. After sorbent saturation, a reducing gas stream 25 is introduced into the first reactor 21 (or 22) to regenerate the metal oxide sorbent 23 and produce a variable-concentration sulfur dioxide stream 26 that is fed into the catalytic sulfur recovery reactor 27 where it is converted to elemental sulfur by reacting with a reducing gas stream 28 in the presence of a catalyst 29.

The first and second reactor vessels, 21 and 22, are used alternatively as sorber and regenerator vessels. After the metal oxide sorbent 23 becomes saturated in the first reactor 21, the flow of the combustion exhaust gas stream 20 is redirected to the second reactor 22 where the sulfur dioxide present in the stream 20a is removed by absorption on an active metal oxide sorbent 23a, forming a solid sulfate. After absorption in the second reactor 22, the treated gas stream 24a is released. The reducing gas stream 25a is redirected to the first reactor 21 to regenerate the metal oxide sorbent 23 and produce a variable-concentration sulfur dioxide gas stream 26a that is fed into the catalytic sulfur recovery reactor 27 where it is reduced to elemental sulfur. Once the metal oxide sorbent 23a becomes saturated in the second reactor 22, streams 20a and 25a are redirected to the first and second reactor respectively. A series of valves (not shown) directing the flow of the alternative streams, 20a, 24a, 25a, and 26a, may be controlled by monitoring the chemistry of the treated gas stream 24, 24a. The gas stream 20 typically is generated as combustion off-gas (or flue-gas) from a coal boiler, or industrial furnace 5.

Typically, the amount of sulfur dioxide present in the combustion exhaust gas stream 20 will be relatively low, ranging in concentration between 0.1% to about 0.5%. Other components of the dilute combustion exhaust gas stream 20 will include, for example, nitrogen, nitrogen oxides, carbon dioxide, oxygen, and steam.

The combustion exhaust gas stream 20 is fed into a first reactor 21 to remove sulfur dioxide by absorption on a solid metal oxide sorbent 23, leaving the first reactor 21 as a clean treated gas stream 24. The metal oxide absorbent 23 may be any single metal oxide such as CuO, $Fe_2O_3$, $CeO_2$, or mixtures thereof unsupported, or mixed with or supported on oxides such as $Al_2O_3$, $TiO_2$, $ZrO_2$, which are known to form sulfates that can be regenerated back to the oxide form either thermally or with reducing gases. Any of the regenerable metal oxide absorbents that have been considered in dry regenerative FGD processes can be used in the first reactor 21 (as, for example, in the Shell/UOP Copper Oxide process, and other similar processes). Also, adsorbents, such as metal oxides, or carbonates, or other salts on high surface area supports may be used in the first reactor 21 (as, for example, in the NOXSO regenerative FGD process).

After continuous contact with the combustion exhaust gas stream 20 the metal oxide absorbent 23 becomes sulfated. Regeneration of the sulfated metal oxide absorbent 23 can be carried out thermally to produce sulfur dioxide or by adding a reducing gas stream 25, such as carbon monoxide, to produce a mixture of gaseous sulfur compounds including sulfur dioxide, carbonyl sulfide, and elemental sulfur. The sulfur dioxide concentration of the regeneration off-gas stream 26 typically is between about 1.0% to about 10.0%. This variable concentration sulfur dioxide gas stream 26 may then be introduced into the catalytic sulfur recovery reactor 27. Other components of the variable concentration sulfur dioxide gas stream 26 may include, for example, nitrogen, carbon dioxide, and water vapor.

The variable-concentration sulfur dioxide gas stream 26 is fed into the catalytic sulfur recovery reactor 27 and may be converted in a manner similar to that described above. This conversion process is more flexible and allows for slightly lower sulfur dioxide conversion and/or selectivity to elemental sulfur. Thus, the reaction temperature can vary from 350° C.–550° C., and the $CO/SO_2$ ratio can vary from 1.0 to 3.0. This is due to the fact that the tail gas 30, after sulfur condensation in the sulfur trap 31, can be taken to the furnace 5 as shown in FIG. 2. The volumes of streams 25 or 26 and 28, 30 are all more than 10-20 times lower than the main flue gas stream 20. Other options, not shown in FIG. 2, include, for example, recycling tail gas 30 to the second reactor 22 and/or the flue gas stream 20. Because of the process flexibility, the catalyst requirements for the catalytic sulfur recovery unit 27 are more flexible as well. Therefore, while cerium oxide catalyst formulations provide better combine activity and elemental sulfur selectivity for reduction of $SO_2$, other sulfur recovery catalysts may also be used in the process.

Although a simplified block diagram of a dry regenerative FGD process is shown in FIG. 2, the process of the present invention also is applicable for regenerative hot gas cleanup, where the hot gas is a hydrogen, carbon monoxide-rich gas produced by gasification of a fossil fuel, such as coal. In such a gas, the sulfur species are in reduced form (for example, $H_2S$ and some organosulfur compounds). These species may be similarly removed by metal oxide sorbents to form sulfides in the first reactor. The sulfides would then be regenerated in the second reactor, not with reducing gas but with oxygen containing gases, back to the oxide form, typically releasing $SO_2$-rich streams of variable concentration which may also contain some oxygen. These streams may then be taken to a catalytic sulfur recovery unit for the direct conversion to elemental sulfur. After condensation, the low volume tail gas may be taken to the gasifier.

Figure 3:
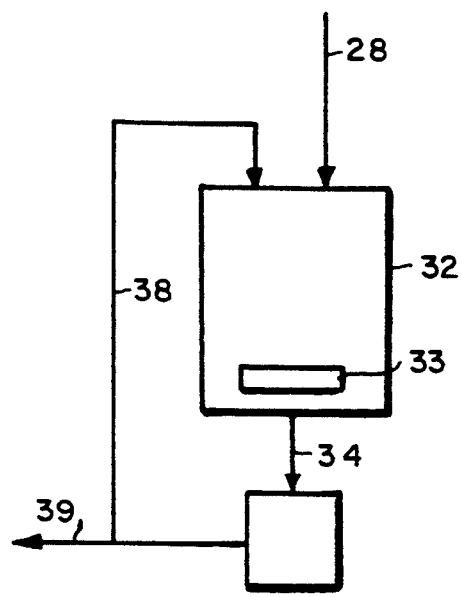
FIG. 3 is a schematic representation of a sulfur recovery process according to the present invention.

FIG. 3 is a subset of FIG. 2 for the case where the operating conditions of the second reactor 22 (regenerator) match those of the catalytic sulfur recovery reactor 27, thereby combining the two vessels into a single regenerator reactor 32. This case excludes the hot gas cleanup application, mentioned above, as in that case, the regenerator reactor 32 operates with oxidative gas. In the regenerator reactor 32, the catalyst 33 may be a cerium oxide formulation in addition to the active metal oxide sorbent (not shown) used in the first reactor 21 to remove the sulfur dioxide. If the metal oxide sorbent was based on $CeO_2$, no other catalyst addition may be needed. In that case, however, the operating temperature should be one that firstly regenerates the $CeO_2$ (reduces the cerium sulfate back to the oxide, emitting a concentrated $SO_2$ stream). Because the catalytic action is specific to $CeO_2$ and not to its sulfate, there is then a need for a recycle stream 38 to bring the emitted sulfur dioxide stream 34 back to the regenerator reactor 32 for reduction over the $CeO_2$ (regenerated) catalyst 33. This is shown in FIG. 3. The temperature for complete reduction of cerium sulfate with a reducing gas such as carbon monoxide exceeds 500° C. After condensation, the tail gas stream 39 may be directed to the same units as in FIG. 2.

The present invention will be further illustrated by the following examples which are intended to be illustrative in nature and are not to be construed as limiting the scope of the invention.

EXAMPLE I

The activity and selectivity of the reduction of sulfur dioxide by carbon monoxide in the presence of a cerium oxide catalyst was examined. The experimental results are presented in Table 1.

The cerium oxide catalyst was prepared according to a procedure as described below:

A cerium nitrate solution was prepared by dissolving 217 grams of $Ce(NO_3)_3 6H_2O$ powder in deionized water. A citric acid solution was prepared by dissolving 105 grams of $H_3C_6H_5O_7 H_2O$ powder in deionized water. The cerium nitrate solution was added slowly into the solution of citric acid over one hour. The solution obtained was dried on a rotary evaporator at 70° C. for one hour, then dried in a vacuum oven at 70° C. overnight. The solid foam obtained was pyrolyzed in air flow at 550° C. for 30 minutes, followed by further air calcination at 550° C. for three hours.

Activity evaluation of the ceria catalyst was performed in a packed-bed microreactor. The reactor consisted of a quartz tube of 1.5 cm I.D. vertically mounted inside an electric furnace equipped with a temperature controller. The catalyst was supported on a fritted quartz disc in the middle of the reactor tube.

A gas stream containing sulfur dioxide (1.3%), carbon dioxide (5.0%), and nitrogen (93.7%) was fed into the reactor. A reducing gas of carbon monoxide was also introduced into the reactor. The ratios of carbon monoxide to sulfur dioxide were varied around the stoichiometric ratio for the complete reduction of sulfur dioxide with carbon monoxide to elemental sulfur. The two gas streams were reacted in the presence of the ceria catalyst. The catalyst had a surface area of about 25 $m^2/g$ as determined by BET surface area measurements. The reaction temperature was 500° C., the reaction pressure was atmospheric, and a gas space velocity of 2,000 scc/(cc)hr was used. Sulfur was knocked out of the product gas stream by condensation in an ice trap. Inlet and exit gases were analyzed by gas chromatography. Elemental sulfur collected in the condenser was extracted with carbon disulfide, dried to a solid residue, dissolved in a sodium sulfite solution, and analyzed by a standard iodometric titration method.

Process conditions and gas stream compositions were slightly varied for experimental Run 3. For that run, a gas stream containing sulfur dioxide (1.02%), and nitrogen (98.98%) was fed into a reactor. The ratio of carbon monoxide to sulfur dioxide was 2.09. The two gas streams were reacted in the presence of a ceria catalyst. The catalyst had a surface area of about 25 $m^2/g$. The reaction temperature was 550° C., the reaction pressure was atmospheric, and a space velocity of 2,000 scc/(cc)hr was used.

TABLE 1

| Run | CO/$SO_2$ Ratio | $SO_2$ Conversion (%) | Selectivity COS (%) | S |
|---|---|---|---|---|
| 1 | 1.63 | 80.5 | 2.2 | 97.8 |
| 2 | 1.90 | 91.5 | 4.8 | 95.2 |
| 3 | 2.09 | 100 | 7.7 | 92.3 |
| 4 | 2.34 | 100 | 33.1 | 66.9 |

As shown in Table 1, better than 90% sulfur dioxide conversion is realized around the stoichiometric ratio of carbon dioxide to sulfur dioxide. This conversion is highly selective toward sulfur, even at CO/$SO_2$ ratios higher than the stoichiometric ratio.

Upon review of the results reported in Table 1, it is clear that the use of the cerium oxide catalyst in the present invention yields a combined high conversion of $SO_2$ with high selectivity toward elemental sulfur. As a result, a more efficient process for recovery of elemental sulfur is achieved.

EXAMPLE II

The activity and selectivity of the reduction of low concentration sulfur dioxide by carbon monoxide concentrations largely exceeding the stoichiometric amount was examined in the presence of the same bulk cerium oxide catalyst used in EXAMPLE I. The experimental results are presented in FIG. 4.

A gas stream containing sulfur dioxide (0.15%), carbon dioxide (5.0%), carbon monoxide (10.0%), and nitrogen (balance) was fed into the reactor preheated at 400° and 500° C. The ratio of carbon monoxide to sulfur dioxide was very high ($CO/SO_2=66$). In the presence of 0.5 grams of the cerium oxide catalyst, sulfur dioxide was reduced by carbon monoxide to elemental sulfur and carbonyl sulfide as a by-product. The reaction was carried out at atmospheric pressure with a space velocity of 2,000 scc/(cc)hr.

Figure 4:
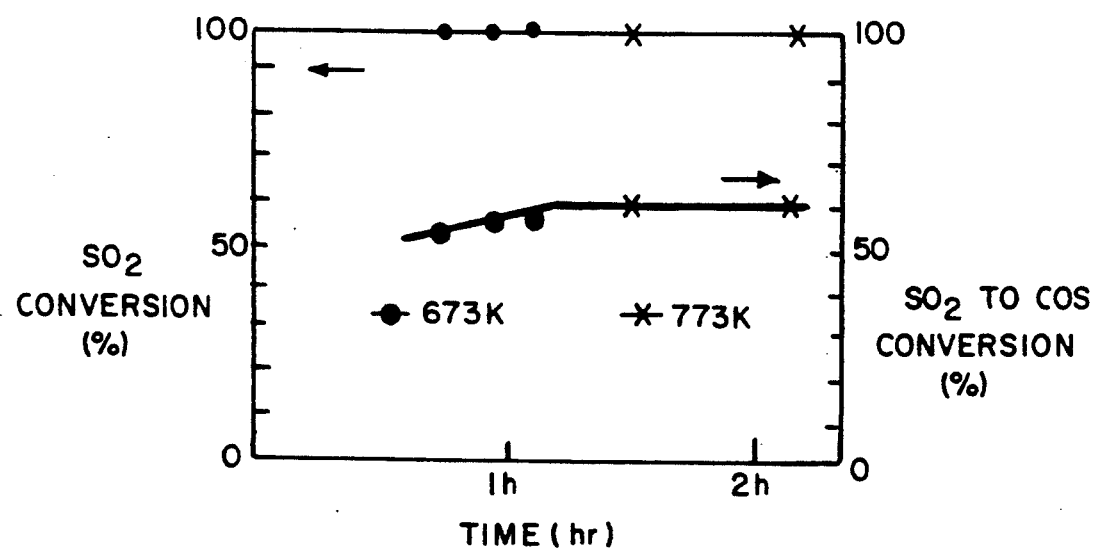
FIG. 4 is a graphical representation of the sulfur dioxide conversion results of EXAMPLE II.

As shown in FIG. 4, complete sulfur dioxide conversion is realized at both temperatures of 400° and 500° C. The selectivity of sulfur dioxide toward elemental sulfur is 50 to 60%, although carbonyl sulfide is clearly the thermodynamically favored product for the $CO/SO_2$ ratio used in these tests.

Upon review of the above results it is clear that cerium oxide is a highly active catalyst for the selective reduction of sulfur dioxide to elemental sulfur.

Although particular embodiments of the invention have been described in detail for purposes of illustration, various modifications may be made without departing from the spirit and scope of the invention. Accordingly, the invention is not to be limited except as by the appended claims.

What is claimed is:

1. A process for recovering elemental sulfur comprising the steps of:

feeding a gas stream containing sulfur dioxide into a catalytic reactor;

introducing a reducing gas stream into said catalytic reactor, wherein said reducing gas is selected from the group consisting of carbon monoxide, natural gas, carbon monoxide-containing hydrogen gas, and mixtures thereof;

reacting the sulfur dioxide with said reducing gas in the presence of a catalyst containing cerium oxide as the only active component to produce elemental sulfur and a tail gas;

removing said elemental sulfur from said catalytic reactor; and feeding said tail gas to a combustor.

2. The process of claim 1 wherein said cerium oxide is supported to form a supported catalyst, said supported catalyst containing from about 0.5 to about 50.0 percent by weight of cerium oxide, and has a surface area from about 20.0 to about 500.0 m$^2$/g.

3. The process of claim 1 wherein said cerium oxide is unsupported and has a surface area from about 5.0 to about 70.0 m$^2$/g.

4. The process of claim 1, wherein said reducing gas is carbon monoxide, and the ratio of said carbon monoxide to said sulfur dioxide is about the stoichiometric ratio of said reaction.

5. The process of claim 1 wherein said reaction of said sulfur dioxide with said reducing gas in said catalytic reactor takes place at a temperature of between about 300° C. to about 700° C.

* * * * *